United States Patent [19]

Barclay et al.

[11] 4,332,135
[45] Jun. 1, 1982

[54] ACTIVE MAGNETIC REGENERATOR

[75] Inventors: John A. Barclay; William A. Steyert, both of Los Alamos, N. Mex.

[73] Assignee: The United States of America as respresented by the United States Department of Energy, Washington, D.C.

[21] Appl. No.: 228,836

[22] Filed: Jan. 27, 1981

[51] Int. Cl.³ .......................................... F25B 21/02
[52] U.S. Cl. ...................................................... 62/3
[58] Field of Search .............................................. 62/3

[56] References Cited

U.S. PATENT DOCUMENTS

| | | | |
|---|---|---|---|
| 428,057 | 5/1890 | Tesla et al. | |
| 2,510,800 | 6/1950 | Chilowsky | |
| 2,589,775 | 3/1952 | Chilowsky | |
| 2,619,603 | 11/1952 | Chilowsky | |
| 3,108,444 | 10/1963 | Kahn | 62/3 |
| 3,154,927 | 11/1964 | Simon | 62/3 |
| 3,393,526 | 7/1968 | Pearl | 62/3 |
| 3,413,814 | 12/1968 | van Geuns | 62/3 |
| 3,774,404 | 11/1973 | Walker et al. | 62/3 |
| 3,841,107 | 10/1974 | Clark | 62/3 |
| 4,033,734 | 7/1978 | Steyert | 62/3 |
| 4,069,028 | 1/1978 | Brown | 62/3 |
| 4,107,935 | 8/1978 | Steyert | 62/3 |

OTHER PUBLICATIONS

G. V. Brown, Journal of Applied Physics, 47, 3673 (1976).
J. A. Barclay et al., Journal of Applied Physics, 50, 5870 (1979).
J. A. Barclay et al., Los Alamos Scientific Laboratory Report, LA-8134 (Feb. 1980).

Primary Examiner—Lloyd L. King
Attorney, Agent, or Firm—Robert W. Weig; Paul D. Gaetjens; Richard G. Besha

[57] ABSTRACT

The disclosure is directed to an active magnetic regenerator apparatus and method. Brayton, Stirling, Ericsson, and Carnot cycles and the like may be utilized in an active magnetic regenerator to provide efficient refrigeration over relatively large temperature ranges.

23 Claims, 8 Drawing Figures

ACTIVE MAGNETIC REGENERATOR

BACKGROUND OF THE INVENTION

The field of the invention relates to magnetic regeneration and more particularly to active magnetic regeneration.

Active magnetic regeneration combines the operation of a regenerator with the magnetocaloric affect. Regenerators have been used in thermodynamic devices for a substantial period of time. However, the materials in known devices have been passive such as lead and stainless steel. Publications directed to reciprocating magnetic refrigerators such as that of G. V. Brown, Journal Applied Physics, 47, 3673 (1976), J. A. Barclay, O. Moze, and L. Paterson, Journal Applied Physics, 50, 5870 (1979) exist, and J. A. Barclay and W. A. Steyert, Los Alamos Scientific Laboratory report LA-8134 (February 1980).

U.S. Pat. No. 4,069,028 to Brown discloses an apparatus and method for magnetic heat pumping. In this device a rare earth material such as gadolinium is used in a fluid regenerator. The temperature and the applied magnetic field of the rare earth are controlled, causing the rare earth to cycle through a temperature-magnetic entropy loop. Brown also discloses that the system may use more than one working substance and suggests the use of gadolinium which may span approximately 20° C. near room temperature in such a loop. Brown also suggests that by providing a regenerator, a room temperature spread between a heat sink and a load may be expanded even further. The Brown Patent references U.S. Pat. Nos. 2,619,603 and 2,589,775 to Chilowsky, the former disclosing that nickel alloys may be used, and that a cascade of several alloys with graduated variations in Curie temperature may be provided to allow larger temperature intervals to be spanned in the refrigeration cycle. The latter suggests employing the heating and cooling effect resulting from passing the material through the Curie point or in the vicinity of the Curie point in order to enhance the desired heating or cooling. The Brown device and method of utilizing it are distinguishable from that of the present invention in several ways. The Brown device uses a fluid generator, separate from its magnetic material, which provides heating or cooling upon magnetization of demagnetization. The present invention utilizes the magnetic material itself as the regenerator as well as a heating or cooling mechanism. The Brown device using a single magnetic material plus a fluid regenerator has a larger temperature span than a magnetic material without a regenerator. However, the temperature span is still limited by the decrease in entropy change as the operating temperature deviates from the Curie temperature of the magnetic material. The maximum practical temperature span of a Brown device is about 60-80 K, i.e., a span of 30-40 K on either side of the Curie temperature. The only way to increase the temperature span is to stage devices with several heat exchangers to couple stages. In practicing the present invention, a plurality of layers of ferromagnetic materials is disposed in a regenerator such that each material operates near its Curie temperature to provide a large temperature span in a single device, such as 4 K to 300 K or even larger. This is accomplished by the unique combination of refrigeration and regenerative parts and steps. Brown's device provides refrigeration at only one temperature, the coldest temperature. The present invention can provide refrigeration along the entire temperature span of the device because each of the distributed segments of the regenerator executes its own refrigeration cycle. The "distributed refrigeration" feature of the present invention is desirable in many applications such as liquefaction of cryogens and is also advantageous when compared to gas refrigeration cycles where refrigeration is only provided when expansion occurs at several distinct points in a cooling process.

SUMMARY OF THE INVENTION

One object of the invention is to provide efficient refrigeration over temperature ranges in excess of 20° C.

Another object of the present invention is to provide reliable refrigeration without need for much maintenance, a condition required for a refrigerator disposed on an unmanned satellite.

In accordance with the present invention, there is provided an apparatus and method for refrigeration. The apparatus comprises a superconducting magnet which may be solenoidal. A piston comprising a substance such as a rare earth substance which is maintained near its Curie temperature reciprocates through the bore of the solenoidal magnet. A magnetic drive rod is connected to the piston and appropriate heat sinks are connected thereto. The piston is driven by a suitable mechanical drive such as an electric motor and cam.

In practicing the invention, the body of the piston is magnetized and demagnetized as it moves through the magnetic field of the solenoid to approximate any of the following cycles or a condition thereof as well as, potentially, other cycles: Brayton, Carnot, Ericsson, and Stirling.

One advantage of the present invention is that refrigeration can be accomplished over at least a 20° C. scale at superconducting temperatures as well as at more conventional temperatures.

Another advantage of the present invention is that refrigerators in accordance therewith operate at very high efficiency.

Another advantage of the present invention is that refrigerators in accordance herewith are relatively small in size, low in operational speed, and very high in reliability.

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

The basic theory of an active magnetic regenerator is that of an ordinary regenerator except that the temperature of the material can be changed by the application or the removal of a magnetic field and that a thermal wave-front propragates back and forth within the regenerator. Each different material, if a plurality of materials are utilized, executes a small Brayton or other desired cycle near its Curie temperature, $T_o$. When all the materials are combined they may yield a Brayton or other desired cycle over an extended temperature range such as 20–40 K or much more.

Figure 2:
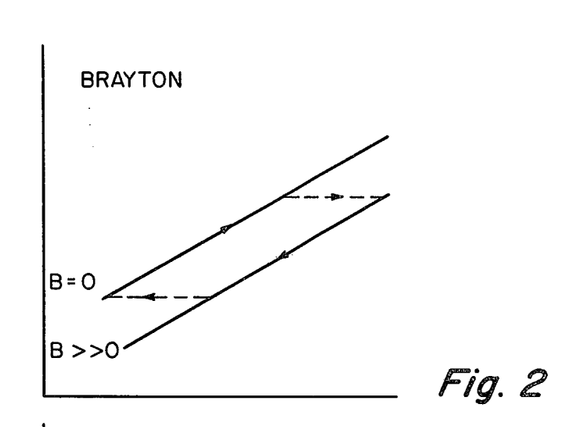

A basic Brayton cycle may be described as follows with reference to FIG. 2 and FIG. 5, the basic cycle being illustrated in FIG. 5. In a porous bed regenerator comprising a series of different ferromagnetic materials with $T_o$ gradually decreasing from a hot-bath temperature $T_H$ to a cold-bath temperature $T_C$, assume that a temperature gradient is nearly uniform but displaced to the left of center in the regenerator as shown in the top frame of FIG. 5. Those skilled in the art will appreciate that first start up from a warm condition $T_H$ exists everywhere and it will take several cycles to reach the condition we are discussing for a sample illustration, as we are starting with the temperature gradient already established. Upon application of a magnetic field, the temperature all along the bed will adiabatically increase by $\Delta T$ which is about 15 to 20 K for a 10 Tesla field. It will be appreciated that one of the characteristics of magnetic refrigeration is that $\Delta T$ is roughly independent of the temperature T if the material is near its Curie temperature. After the field is applied, helium or hydrogen gas or other suitable fluid at a temperature $T_C + \Delta T$ is pushed through the bed from the cold end which is now $T_C + \Delta T$ to the warm end. As a gas at $T_C + \Delta T$ travels through the bed, the gas will warm and the bed will cool. A thermal wave front will be established as shown in the middle frame of FIG. 5. The overall wave front of magnitude $T_H - T_C$ will propagate through the regenerator to the right in the middle frame of FIG. 5 as gas continues to flow into the bed at $T_C + \Delta T$. The gas leaves the regenerator at $T_H + \Delta T$ until the wavefront arrives at the hot end of the regenerator at which time the temperature of the exciting gas drops to $T_H$. When this happens, the gas flow is stopped and the regenerator is adiabatically demagnetized. Temperatures all along the bed drop by $\Delta T$ as shown in the fourth frame of FIG. 5, in preparation for the reverse flow of gas. Gas that came out of the regenerator at $T_H + \Delta T$ during the magnetizied stage is put through a heat exchanger and cooled to $T_H$ before it is pushed back into the regenerator after demagnetization. Another wave front of magnitude $T_H - T_C$ is established, traveling in the opposite direction to the first thermal wavefront as shown in the bottom frame of FIG. 5. The gas exits the cold end at $T_C$ and is placed in contact with a load to be heated to $T_C + \Delta T$. When the gas temperature at the cold end of the regenerator increases from $T_C$ to $T_C + \Delta T$, the gas flow is stopped and the cycle now repeats as the generator is once again magnetized.

The finite heat transfer between the heat-exchange gas and the magnetic solid along with the axial conduction in the bed will tend to disperse the thermal wavefront as it proprogates through the regenerator. In a nonactive (nonmagnetic-normal type) regenerator these effects will gradually reduce the thermal gradient by spreading a temperature change out across the whole bed. However, in an active magnetic regenerator, the wavefront proprogates back and forth through the regenerator without complete dispersion because the wavefront is sharpened every half cycle by the incoming gas and because refrigeration is provided along the entire length of the bed.

Those skilled in the art will recognize that there should be an excellent heat transfer between the heat exchange fluid and the solid bed and simultaneously there should be a small pressure drop as the heat exchange fluid flows through the bed.

An active magnetic regenerator requires a selection of materials that have their Curie temperatures $T_o$ ranging from near 20 K to near 300 K. Below 20 K, a paramagnetic material such as a gadolinium gallium garnet, gadolinium phosphate, or gadolinium hydroxide can be used. Ideally, a continuous range of $T_o$ can be used. There are many gadolinium based materials that have $T_o$ in the 20–300 K range. Some of these are presented in the following table.

With regard to superconducting magnets, technology using NbTi and $NbSn_3$ materials is well developed. Magnets capable of producing 10 Tesla field are available using either material. In experiments, 10 Teslas appears to be the practicle upper limit for superconducting magnets and practicing the invention.

Magnetic work in the thermodynamic cycle is not put into the refrigerator by charging the magnet so that once the field is established the magnet can operate in a persistent mode. The current leads to the magnet can be removed to reduce heat leak into the liquid helium. The steady magnetic field eliminates charging losses due to flux jumpings and will reduce any current losses to an negligible level. The magnet requires an initial liquid helium transfer but thereafter the refrigeration requirement can be provided by a small magnetic refrigerator stage from the operating temperature to 4 K which will add a parasitic load onto the main refrigerator system. For example, a refrigerator capable of 100 W at 20 K should fit into a Dewar that has a refrigeration requirement of 0.1 to 0.2 W at 4 K. A magnetic refrigerator stage operating between 4 and 20 K should approach 90% of Carnot efficiency so that the load at 20 K will be 0.56 to 1.1 W. This usurps only about 1% of cooling power of 20 K. Clearly, scaling loss favor larger systems so that in larger refrigeration systems parasitic magnetic refrigeration loads are almost negligible. Furthermore, superinsulated Dewars with vapor cooled shielding are readily available and have remarkably low losses. This type of Dewar can maintain its integrity for years.

TABLE

Gadolinium Compounds or Alloys and their Curie Temperatures

| Compound/Alloy | $T_o$ (K) | Compound/Alloy | $T_o$ (K) |
|---|---|---|---|
| $Gd_{2.71}S_4$ | 21 | $Gd_{0.5}Ag_{0.5}$ (amorphous) | 100 |
| $GdAg_{0.8}In_{0.2}$ | 24 | $GdAg_{0.5}In_{0.5}$ | 111 |
| $Gd_{2.73}S_4$ | 28 | $Gd_{0.68}N_{0.32}$ | 125 |
| $Gd_{0.65}Th_{0.35}Al_2$ | 30 | $Gd_{0.8}Au_{0.2}$ (amorphous) | 150 |
| $Gd Ni_5$ | 32 | $Gd Al_2$ | 153 |
| $Gd Ni_2$ (amorphous) | 38 | $Gd_{0.7}La_{0.3}$ | 185 |
| $Gd_{2.76}S_4$ | 42 | $GdGa$ | 200 |
| $Gd_{0.7}Th_{0.3}Al_2$ | 50 | $Gd_{0.67}Y_{0.33}$ | 211 |
| $Gd Ag_{0.7}In_{0.3}$ | 57 | $GdZn_{0.85}In_{0.15}$ | 224 |
| $Gd_{2.8}S_4$ | 58 | $Gd_{0.80}Y_{0.20}$ | 254 |
| $Gd N$ | 65 | $Gd Zn$ | 268 |
| $Gd Ni_2$ (crystalline) | 81 | $Gd_{0.90}Y_{0.10}$ | 281 |

TABLE-continued

| Gadolinium Compounds or Alloys and their Curie Temperatures | | | |
|---|---|---|---|
| Compound/Alloy | $T_o$ (K) | Compound/Alloy | $T_o$ (K) |
| | | Gd | 293 |
| $Gd_{0.8}Th_{0.2}Al_2$ | 90 | $GdMn_2$ | 300 |

Figure 6:
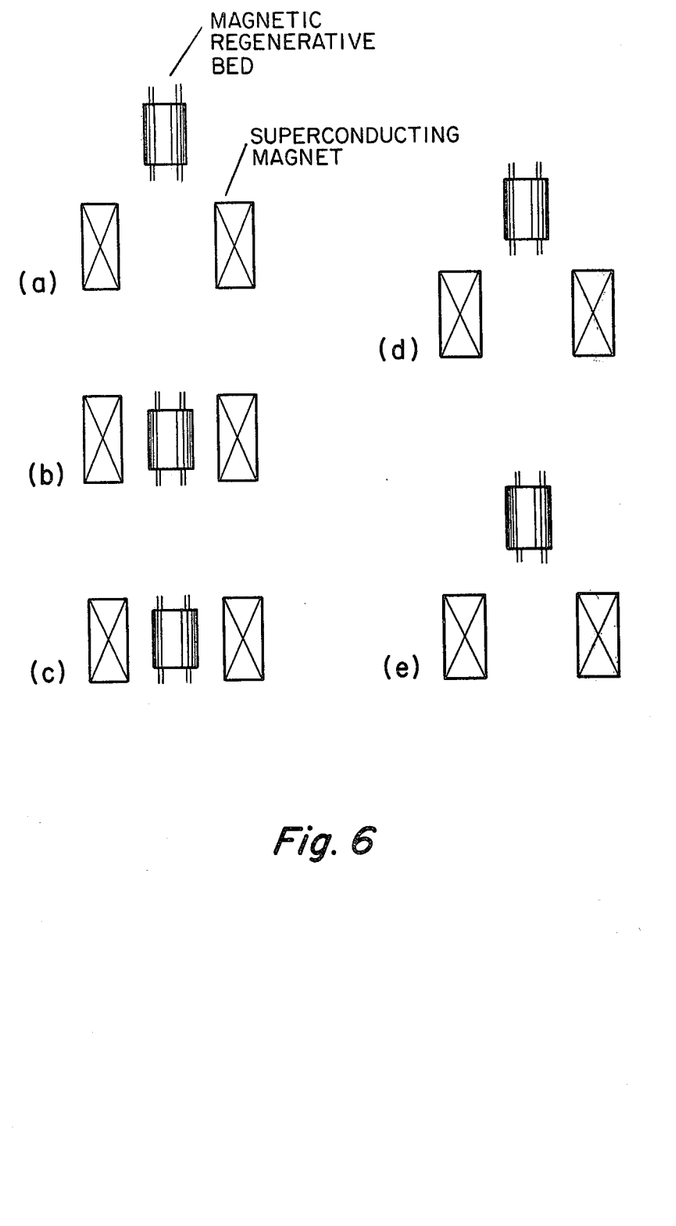
FIG. 6 schematically shows movement of a magnetic regenerative bed through a superconductive magnet in practicing the invention.
Figure 7:
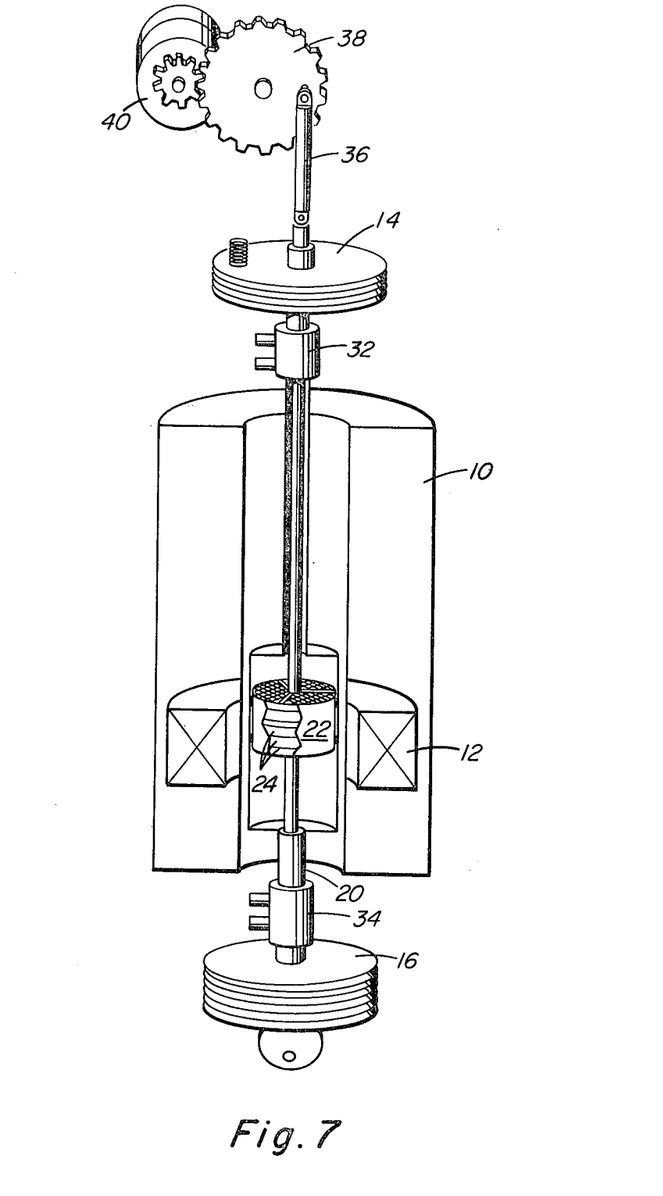
FIG. 7 illustrates an exemplary embodiment for practicing the invention.

FIG. 6 illustrates steps a, b, c, d, and e, schematically showing the steps for an apparatus such as that illustrated in FIG. 7 for carrying out the invention. In practicing the invention, a Stirling cycle is approximated using an initial state of partial magnetization at a temperature above the Curie temperature and utilizing two, 2-phase external heat transfer fluids at temperatures at $T_C$ and about $T_H$. In step a, a section of the body or piston is magnetized near but slightly above its Curie temperature such that the hot end of the piston is at a temperature essentially $T_H$. The internal heat transfer fluid flows through it at an initial temperature $T_C$ during full magnetization of the body. This causes temperature to increase from the magnetization which is compensated by temperature decrease due to thermal wave movement through the material. The net result causes internal heat transfer fluid to exit the body at a temperature $T_H$ plus $\Delta T$, $\Delta T$ being small, which transfers heat to the two-phase heat exchange fluid at $T_H$ which approximates an isothermal magnetization of the piston or body. In step b, the internal heat transfer fluid continues to flow into the body at about $T_C$ but the magnetic field is decreased slightly so that the average temperature within the body decreases. Magnetization remains essentially constant resulting in an isomagnetization temperature decrease within the body. The internal heat exchange fluid exits the body at $T_H + \Delta T$. In step c, the flow of the internal fluid is reversed, flowing at $T_H$ into the body as demagnetization is compensated by temperature increase due to thermal wave motion in the body. The fluid exiting the body at $T_C - \Delta T$, $\Delta T$ being small, causes heat to be transferred from the 2-phase external heat exchange fluid at $T_C$, which approximates isothermal demagnetization. In step d, the reverse flow of fluid is continued through the body and with a slight increase in the magnetic field thereon to maintain constant magnetization as the average temperature of a body increases. The fluid exits at $T_C - \Delta T$ approximating an isomagnetization temperature increase. The heat is transferred from the internal fluid to the two, 2-phase external heat exchange fluids to accomplish refrigeration.

Figure 3:
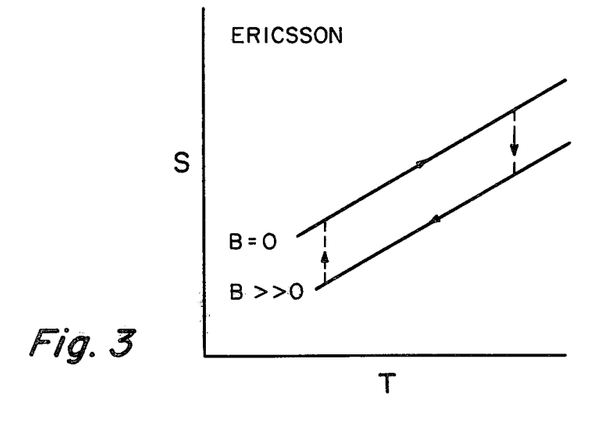
Figure 4:
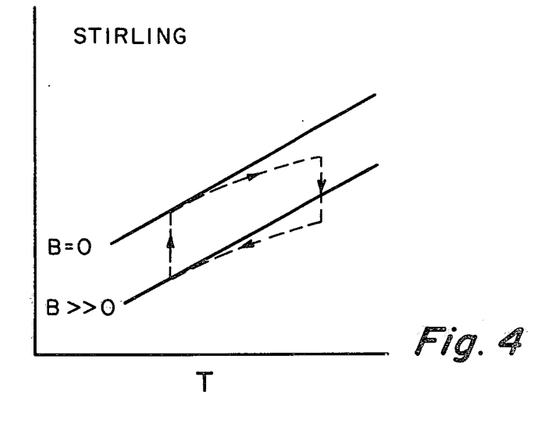

Still referring to FIG. 6, an Ericsson cycle as shown in FIG. 3 can be approximated. The first step of the Ericsson cycle is the same as that of the Stirling cycle except demagnetization is the initial state. In step b, the internal fluid flows at $T_C$ continuously after magnetization to cool the material of the body by fluid flow while in a constant magnetic field. Fluid exits at $T_H + \Delta T$, approximating an isofield temperature change. Step c is the same as in the Stirling cycle. In step d, the fluid flow continues after demagnetization is complete so that the body warms as the fluid exits the body at $T_C - \Delta T$ which approximates some isofield temperature change. Heat is transfered from the fluid at the ends of steps a and c.

Figure 1:
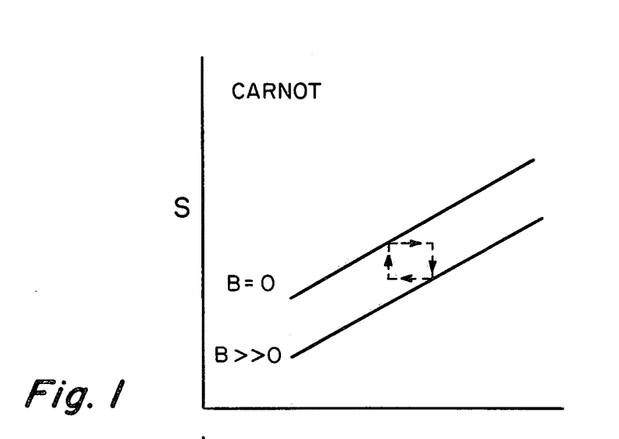
FIGS. 1, 2, 3 and 4 illustrate Carnot, Brayton, Ericsson and Stirling cycles over which the invention may operate.

The invention may be practiced utilizing a Carnot cycle as shown in FIG. 1. The first step is the same as in the Stirling cycle. In step b, the fluid is stopped during partial demagnetization at a selective midpoint causing an adiabatic temperature decrease. In step c, magnetization is completed as the fluid flows in the body at slightly greater than $T_H$ such that the temperature decrease due to demagnetization is exactly compensated by temperature increase due to thermal wave movement within the body. In this step the fluid exits the body at slightly less than $T_C$ which approximates isothermal demagnetization. In step d, fluid flow is stopped as the magnetic field is caused to increase such that the temperature increases by about $\Delta T$, an adiabatic temperature increase. The fluid exiting at about $T_H$ is cooled in an external heat exchanger and the fluid exiting at about $T_C$ is heated in an external heat exchanger. Those skilled in the art will appreciate that hybrides of the various exemplary cycles can be adapted in practicing the invention.

Figure 8:
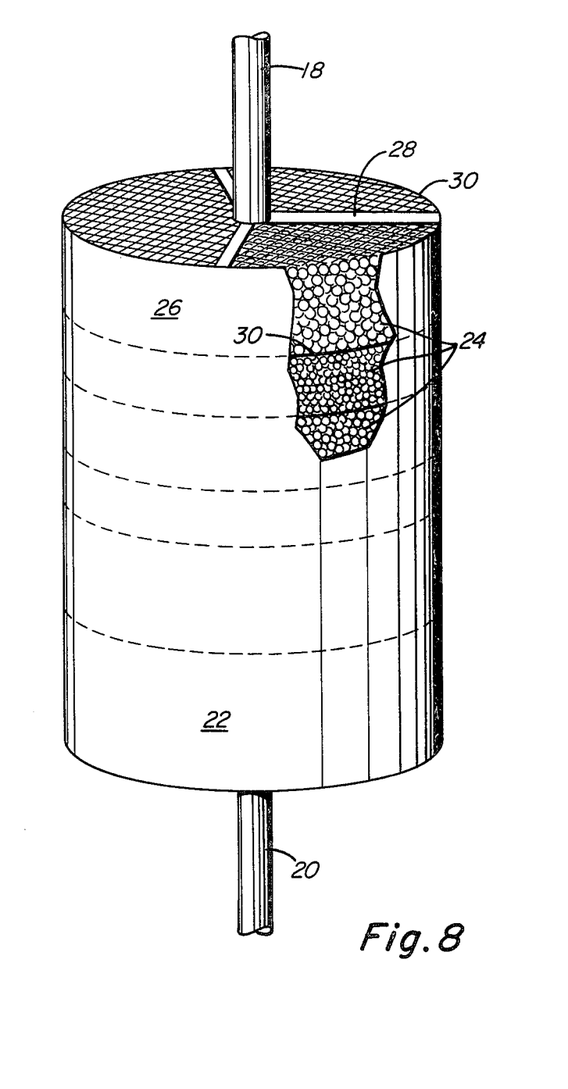
FIG. 8 shows a piston usable in the FIG. 7 embodiment.

Apparatus capable of carrying out the method of the invention is illustrated in FIGS. 7 and 8. It will be appreciated by those skilled in the art that only the simplest of potential embodiments are illustrated so that the invention may be more readily explained. The apparatus comprises a Dewar 10 which maintains at a super conducting temperature a solenoidal magnet 12. Pumps such as bellows 14 and 16 are disposed at opposite ends of magnetic drive rods 18 and 20. A piston or body 22 comprising a plurality of layers 24 as more clearly seen in FIG. 8, is disposed to move through the bore of the solenoidal magnet 12. Piston 22 preferably comprises a thin walled container 26 supported about drive rods 18 and 20 by support braces 28. The container is divided into layers 24 by separating devices shown as screens 30 which also act as fluid diffusers to insure temperature homogeneity at their locations within the bed. Magnetic rods 18 and 20 act for force compensation during operation. The portions of them passing through container 22 are nonmagnetic. The materials comprising the magnetic particles have Curie temperatures $T_{o1}$, $T_{o2}$, $T_{o3}$ and the like. Curie temperature of $T_{o2}$ is about 20°–30° C. less than $T_{o1}$. Curie temperature of $T_{o3}$ is ideally less than about 20°–30° C. less than $T_{o2}$ and so on. It should be noted that the sections of different materials are not necessarily of the same thickness and that thickness will depend upon the temperature profile in the body.

Figure 5:
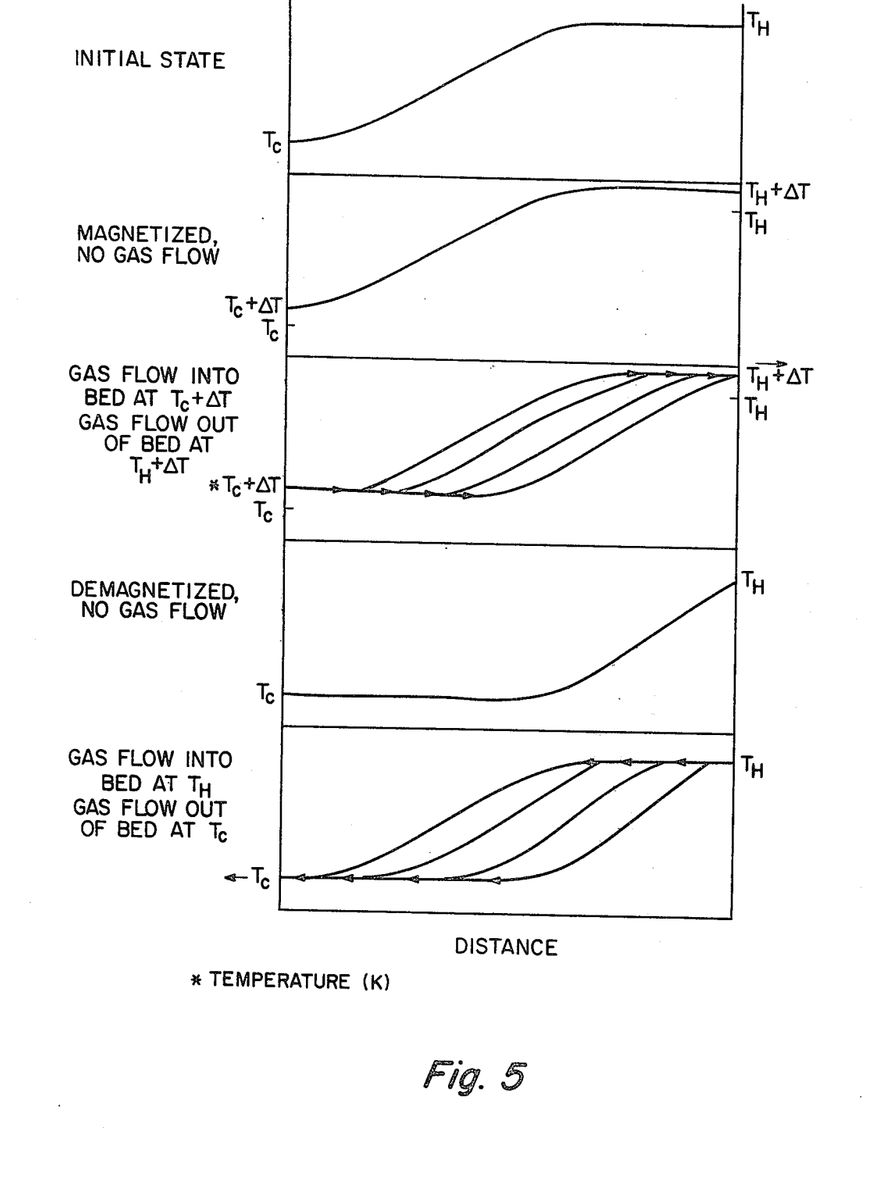
FIG. 5 illustrates temperature as a function of distance in the piston of the invention through an exemplary cycle.

As shown in FIG. 5, the temperature profile of the magnetic regenerator of the invention varies continuously from $T_C$ to $T_H$. It is desirable to have a magnetic material with a Curie temperature at or near the operating temperature of the body. This can be approximated as in the preferred embodiment with a series of different materials as listed in Table I. It can also be accomplished by using amorphous magnetic materials such as $Gd_{1-x}Ag_x$ where the Curie temperature can be varied continuously by extremely small amounts of Ag. For example, $T_o$ changes from 320 K when x=0 to 40 K when x=0.13. This continuously variable Curie temperature may be very useful in preparing magnetic regenerative beds. Heat exchangers 32 and 34 are provided at either end of the magnetic conducting rods 18 and 20 and enable heat exchange between fluid flowing through the piston and a second heat exchange fluid external of the device. The magnetic drive rods are connected through the bellows 14 to another drive rod 36 operating off a drive wheel 38 driven by a geared motor 40 which drives the reciprocating piston 22.

The apparatus of FIGS. 7 and 8 is capable of carrying out the method described heretofore for operating an active magnetic regenerator over Carnot, Brayton, Ericsson and Stirling cycles as well as hybrids of any two or more of such cycles.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of refrigeration approximating a Stirling Cycle from an initial state of partial magnetization and utilizing two, two-phase external heat transfer fluids at temperatures about $T_C$ and about $T_H$, the method comprising the steps of
    (a) magnetizing a body comprising one or more porous magnetic materials near but above their Curie temperatures, each at a temperature between about $T_C$ and about $T_H$, flowing an internal heat transfer fluid at an initial temperature substantially $T_C$ through the porous material during a relatively higher magnetization of the body, any temperature increase caused by magnetization being compensated by temperature decrease due to thermal wave movement through the material, causing the internal heat transfer fluid to exit the body at a temperature slightly above about $T_H$, which approximates isothermal magnetization;
    (b) continuing the internal heat transfer fluid flow into the body at about $T_C$ and decreasing the magnetic field slightly as average temperature within the body decreases, magnetization remaining essentially constant, approximating an isomagnetization temperature decrease within the body, the internal heat exchange fluid exiting the body at slightly above about $T_H$;
    (c) reversing the flow of the internal heat exchange fluid at about $T_H$ through the body as demagnetization is compensated by temperature increase due to thermal wave motion in the body, the fluid exiting the body at slightly less than about $T_C$, approximating isothermal demagnetization; and
    (d) continuing the reverse flow of internal heat exchange fluid through the body and increasing slightly the magnetic field therein to maintain constant magnetization as the average temperature of the body increases, the fluid exiting at slightly less than about $T_C$, approximating an isomagnetization temperature increase; and
    (e) transferring heat from the internal heat exchange fluid to the two, two-phase external heat exchange fluids appropriately during the cycle to accomplish refrigeration.

2. The method of claim 1 wherein a transfer fluid having a very large heat capacity is used.

3. A method of refrigeration approximating an Ericsson Cycle from an initial state of demagnetization and temperature between about $T_C$ and about $T_H$ utilizing an internal heat transfer fluid and two, two-phase external heat transfer fluids, the method comprising the steps of:
    (a) flowing the internal heat transfer fluid through a body comprising one or more porous magnetic materials near their Curie temperatures, each at a temperature between about $T_C$ and $T_H$ during magnetization of the body to temperature increase caused by magnetization being compensated by temperature decrease caused by thermal wave motion within the body, the fluid exiting at slightly above about $T_H$ approximately isothermal magnetization;
    (b) flowing the internal heat transfer fluid at $T_C$ continuously after magnetization to cool material in the body by fluid flow while in a constant magnetic field, the fluid exiting at slightly above about $T_H$, approximating an isofield temperature change;
    (c) reversing the internal heat transfer fluid flow, the fluid initially passing through the body at $T_H$ as demagnetization commences, temperature decrease due to demagnetization being compensated by temperature increase due to thermal wave movement, the fluid exiting at slightly below about $T_C$, approximating an isothermal demagnetization;
    (d) continuing the fluid flow after demagnetization is complete, the body warming the fluid exiting the body at slightly less than about $T_C$ approximating an isofield temperature change; and
    (e) transferring heat from the internal heat transfer fluid at the end of steps (a), (b), (c), and (d) in the cycle to transfer heat.

4. The method of claim 3 wherein a transfer of fluid having a very large heat capacity is utilized.

5. A method of refrigeration approximating a Carnot Cycle from an initial state of partial magnetization utilizing two, two-phase external heat transfer fluids at temperatures of about $T_C$ and about $T_H$, the method comprising as steps of:
    (a) fully magnetizing a body comprising one or more porous magnetic materials near but above their Curie temperatures, each at a temperature between about $T_C$ and about $T_H$, flowing an internal heat transfer fluid at a temperature $T_C$ into the body, temperature increase due to magnetization being compensated by temperature decrease due to thermal wave movement within the body, the fluid exiting at slightly above about $T_H$ which approximates isothermal magnetization;
    (b) stopping the fluid flow during partial demagnetization at a selected midpoint field, thereby approximating an adiabatic temperature decrease;
    (c) completing the demagnetization as the fluid flows into the body at substantially $T_H$ such that temperature decrease due to demagnetization is compensated by temperature increase due to thermal wave movement within the body, the fluid exiting the body at slightly less than about $T_C$ which approximates isothermal demagnetization;
    (d) stopping fluid flow as magnetic field increases to a low value, approximating an adiabatic temperature increase;
    (e) repeating the sequences of steps (a) through (d), the fluid exiting at slightly above about $T_H$ being cooled by an external two-phase fluid heat exchanger during step (a), the fluid exiting at slightly less than about $T_C$ being heated in an external load two-phase heat exchanger during step (c).

6. The method of claim 5 wherein a transfer of fluid having a very large heat capacity is utilized.

7. A refrigeration apparatus comprising:
    a cylindrical dewar having a bore comprising an inner circumferential wall;

a solenoidal superconducting magnet disposed within said Dewars for changing the temperature of said material by the application thereto and removal therefrom of a magnetic field;

a piston body having circumferential walls, a top and a bottom, said piston comprising one or more porous magnetic materials each having a Curie temperature within the operating temperature range of the body;

means providing a seal between said wall of said piston body and said wall of said cylinder Dewars bore;

means for passing a fluid from top to bottom and from bottom to top through said piston body to propagate a reciprocating complex thermal wave through said material;

means for reciprocating said piston body within said cylindrical Dewars bore through the solenoidal magnet; and heat exchanger means for receiving said fluid on both the top and the bottom of said piston and for circulating the fluid through an object to be temperature affected thereby.

8. The invention of claim 7 wherein said piston body is reciprocated by a piston rod.

9. The invention of claim 7 wherein said fluid is moved by pump means.

10. The invention of claim 7 wherein said piston body material comprises a gadolinium compound.

11. The invention of claim 7 wherein said reciprocating means comprises a piston rod.

12. The invention of claim 7 wherein said piston rod comprises a magnetic rod for force compensation.

13. The invention of claim 7 wherein said piston body comprises:

a thin walled container, supporting braces for said container radially extending from said piston rod to said thin wall, a porous bed of magnetic particles having a Curie temperature $T_o$ disposed within said piston body, and screening means at the top and at the bottom of said piston body to contain said particles within said piston body.

14. The invention of claim 13 wherein said piston body comprises:

a plurality of layers, each layer comprising a different type of magnetic particle from other layers, the material of the top most layer having a Curie temperature near about $T_H$ and the material of the bottom most layer having a Curie temperature near about $T_C$, the layers from the top most to the bottom most layers each having a Curie temperature incrementally lower than the Curie temperature of its adjacent above layer.

15. The invention of claim 14 wherein the Curie temperature of each layer differs from its upper adjacent layer by about 20–30 K.

16. The invention of claim 14 wherein each section of magnetic material is of a preselected thickness.

17. An apparatus comprising a plurality of the apparatuses described in claim 7 disposed in series to provide staged refrigeration.

18. The invention of claim 13 wherein porous magnetic material disposed within the piston body comprises a material selected from the group consisting of Dy, DyC, HoZn, Tb, and TbAl$_2$.

19. The invention of claim 13 wherein the material disposed within the piston body is selected from the group consisting of TbGa, TbNi, and TbZn.

20. The invention of claim 13 wherein the material disposed within the piston body comprises a manganese compound.

21. The invention of claim 13 wherein the material disposed within the piston body comprises an iron compound.

22. A method of refrigeration approximating a Brayton Cycle from an initial state of demagnetization utilizing an internal heat exchange fluid and two single phase external heat transfer fluids at temperatures about $T_C$ and about $T_H$, respectively, the method comprising the steps of:

(a) magnetizing a body comprising one or more porous magnetic materials near but above their Curie temperatures, increasing the average temperature of the body at $\Delta T$, approximating an adiabatic magnetization;

(b) flowing the internal fluid at a temperature substantially $T_C + \Delta T$ through the body so that the fluid flows out of the body at $T_H + \Delta T$, approximating an isofield temperature change;

(c) demagnetizing the body to accomplish an adiabatic demagnetization so that the average temperature of the body decreases by $\Delta T$; and (d) flowing the internal fluid through the body at about $T_H$ so that the fluid flows out of the body at about $T_C$; and (e) transferring heat from the fluid during steps (b) and (d) to cycle the external heat transfer fluids for refrigeration.

23. The invention of claim 22 wherein a transfer fluid having a very large heat capacity is used.

* * * * *